Jan. 10, 1967   D. R. OSBORN, JR   3,296,898
RETRACTABLE BORING BAR
Filed March 15, 1965   3 Sheets-Sheet 1

INVENTOR.
DON R. OSBORN, JR.
BY Donald P. Selverki
HIS ATTORNEY

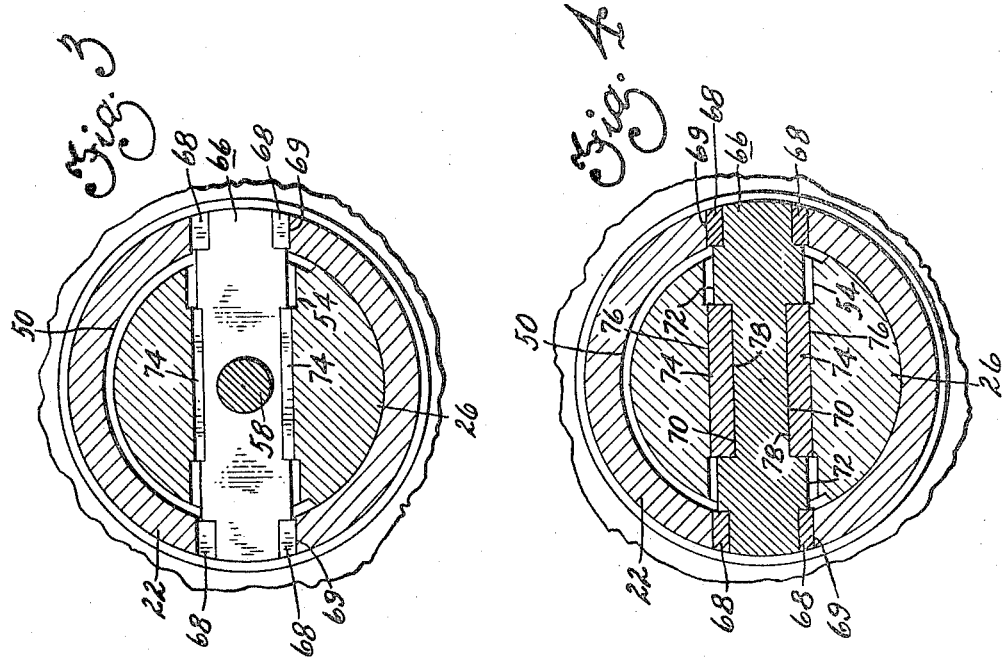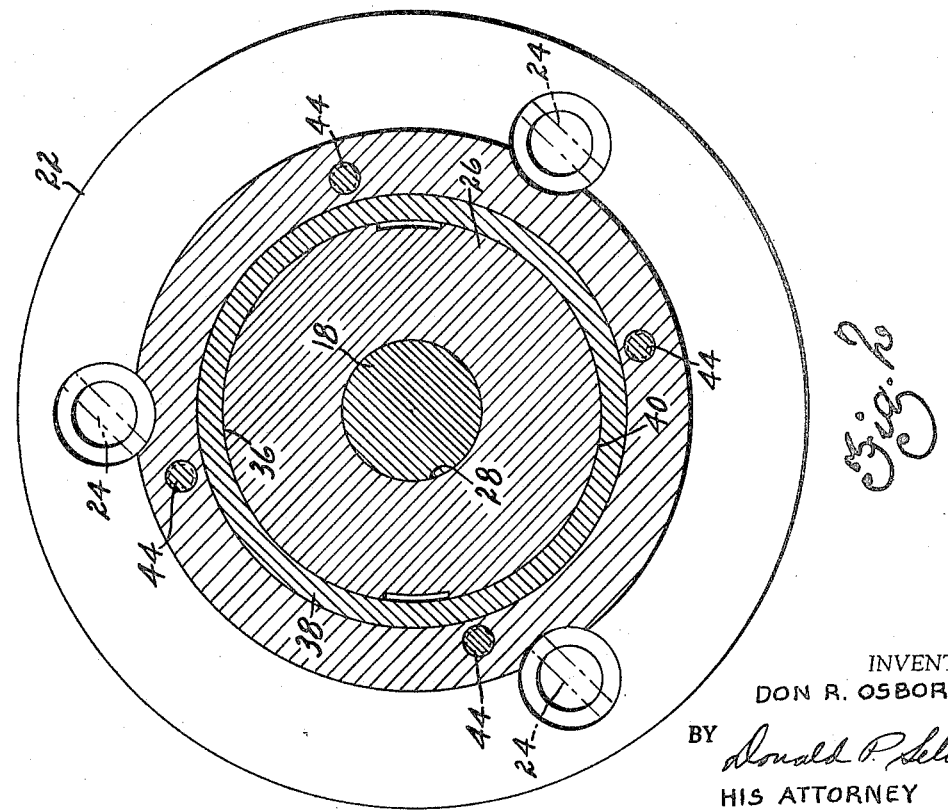

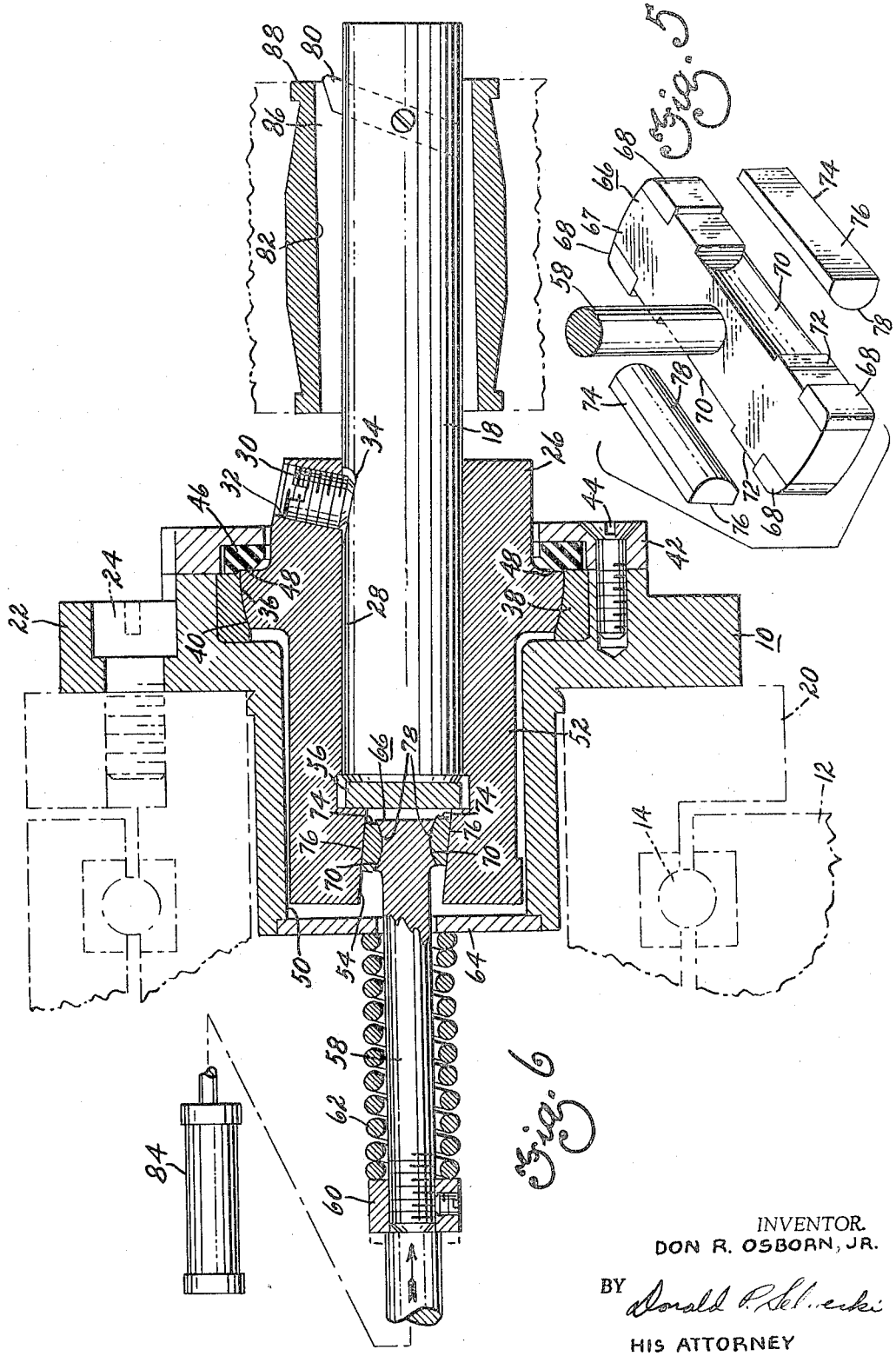

3,296,898
RETRACTABLE BORING BAR
Don R. Osborn, Jr., Dayton, Ohio, assignor to General Motors Corporation, Detroit, Mich., a corporation of Delaware
Filed Mar. 15, 1965, Ser. No. 439,860
3 Claims. (Cl. 77—58)

This invention relates to boring apparatus and more particularly to a boring bar that is rotatable, tiltable and capable of being withdrawn from a bored aperture.

In the boring of apertures where a smooth side wall finish is desired, such as the bore adapted for receiving the power piston in a master cylinder, it is desirable to have mechanism for withdrawing the boring bit from the aperture without damaging the side wall. A typical boring bar has a boring bit extending from one wall thereof a predetermined distance. The boring bar is centrally located with respect to the aperture to be bored. The boring bit extension determines the exact size of the aperture. Therefore, on the side of the bar opposite from where the bit is disposed, a clearance exists into which the bar could be tilted to bring the boring bit away from the finished surface. Once tilted, the bar can be withdrawn from the aperture without the bar or the bit making contact with the finished wall. Having an unmarred finished wall is imperative to insure the free passage of a piston and seals across the finished surface without causing damage to either.

It is an object of the present invention to provide an improved boring device adaptable for use with a standard boring machine which will not damage a bored aperture upon withdrawal of the boring tool.

It is another object of the present invention to provide an improved boring device which is mounted on a machine spindle and adapted to be controllably tilted when the bored aperture is completed and able to be withdrawn therefrom without contact being made with the finished bored aperture.

It is still another object of the present invention to provide an improved boring device which causes a tilting movement of a boring bar in response to lineal movement of a drive means.

It is a further object of the present invention to provide an improved boring device which comprises a body pivotally carrying a support means which in turn carries a boring tool, said support means being cammable in its pivotal mounting on the body to cause a withdrawal of the boring tool from the finished bored surface.

Further objects and advantages of the present invention will be apparent from the following description, reference being had to the accompanying drawings wherein a preferred embodiment of the present invention is clearly shown.

In the drawings:

FIGURE 2 is a sectional view taken along lines 2—2 of FIGURE 1;

FIGURE 3 is a sectional view taken along lines 3—3 of FIGURE 1;

FIGURE 4 is a sectional view taken along lines 4—4 of FIGURE 1;

FIGURE 5 is a perspective view of a portion of the drive mechanism camming the boring bar to a tilted position;

FIGURE 6 is a sectional view of the subject invention similar to that shown in FIGURE 1 but with the boring bar shown in tilted disposition.

Figure 1:
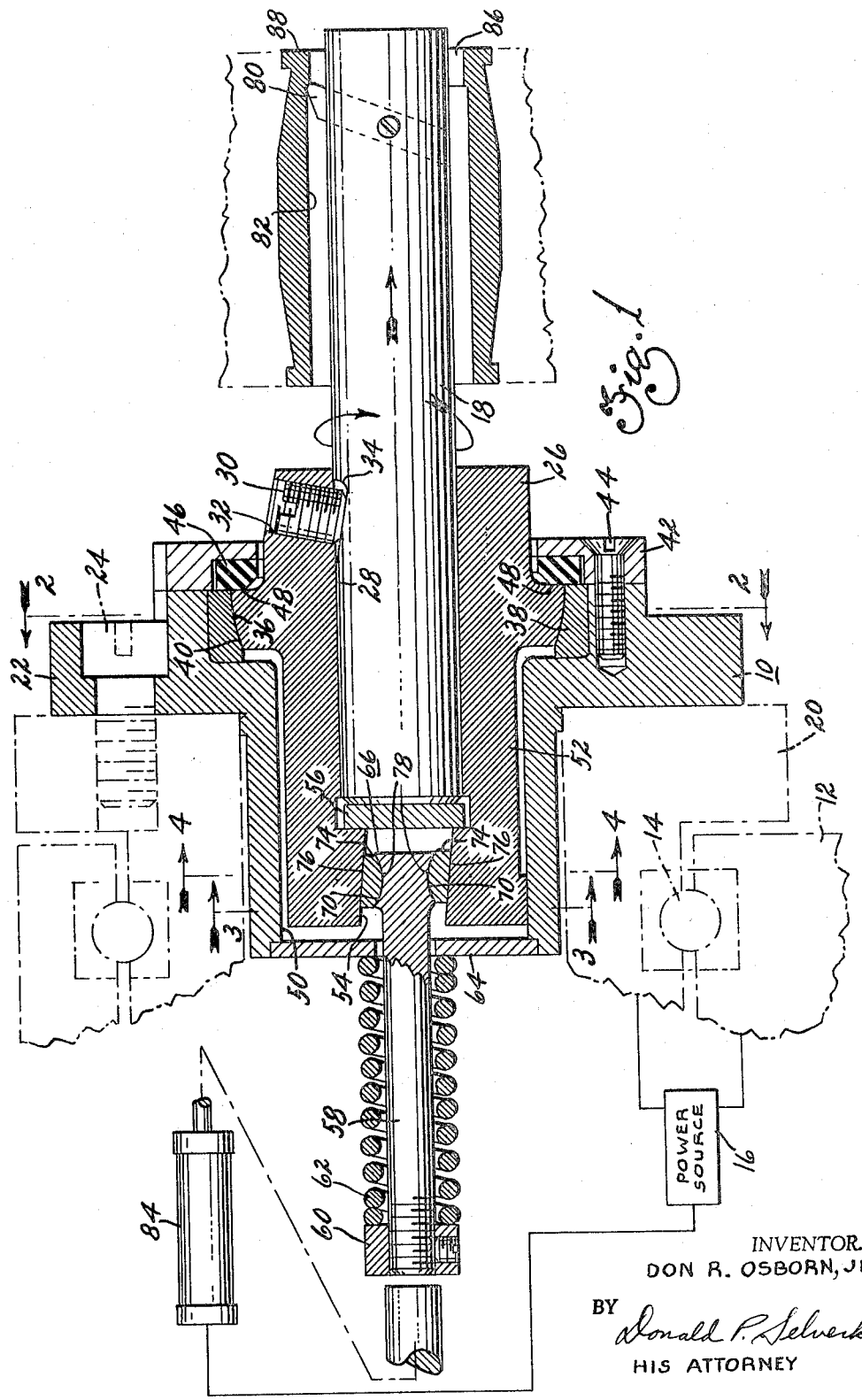
FIGURE 1 is a sectional view of the subject invention with certain force producing elements being diagrammatically shown.

Referring to FIGURE 1, a boring device, generally designated by the numeral 10, is rotatably carried on a boring machine support 12 by bearing 14 so that the device 10 is rotatable with respect to the relatively fixed machine support 12. A power source 16 supplies power for rotation in any well-known manner, for example, by hydraulic means. The machine support 12 is fixed to a movable portion of a boring machine in any well-known manner which allows reciprocating translational movement of the device 10 along the longitudinal axis of a boring bar 18. The power source 16 provides power for this translational movement in any well-known manner, for example, by hydraulic means.

A rotatable spindle 20 is preferably a part of the boring machine and is adapted to carry a body 22 secured thereto by a series of bolts 24. Therefore, the body 22 is fixed with respect to the spindle 20 but is adapted to rotate therewith relative to the boring machine support 12. A carrier element 26 includes a bore 28 adapted to receive the boring bar 18 and the boring bar 18 is maintained fixed with respect to the bore 28 by means of the cooperation of a set screw 30 carried in a threaded bore 32 of the carrier element 26 and a flat locator 34 formed on the outer periphery of the boring bar 18.

Carrier 26 has a bearing surface 36 extending therearound arranged to be pivotal on a substantially circular fixed bearing 38. The bearing 38 is composed of any well-known bearing material and includes an arcuate shaped inner periphery 40 cooperating with the complementary shaped bearing surface 36. Therefore, it is seen that carrier 26 is adapted for pivotal movement on the bearing 38. Carrier 26 includes a retainer plate 42 secured to the main portion of the carrier 26 by means of bolts 44. An elastomeric ring 46 is compressed between the plate 42 and the bearing 38 with a portion contacting the pivotable portion of the carrier 26 at points 48. The function of the elastomeric ring 46 is to allow limited pivotal movement of the bearing surface 36 on the bearing 38 while still maintaining sufficient sealing to prevent dirt from coming into contact with bearing 38 and surface 36.

A bore 50 in the body 22 receives an elongated portion 52 of the carrier 26 and is oversized with respect thereto to allow clearance therebetween to accommodate a pivoting of the carrier 26 in a manner to be hereinafter described. A lateral slot 54 is angularly offset with respect to a longitudinal axis of the carrier 26 and, consequently, is offset with respect to the longitudinal axis of the boring bar 18. A spacer block 56 closes off one end of the slot 54 and provides a locating surface for the boring bar 18 when inserted into its operative position.

A rod 58 carries a spring retainer 60. A spring 62 is carried on the outer periphery of the rod 58 and is compressed between the retainer 60 and a wall 64 of the body 22. The rod 58 is integrally formed with an end guide, generally designated by the numeral 66. Referring to FIGURE 5, the end guide 66 is more clearly shown as being an elongated member 67 which is adapted to be slidable in the slots 69 formed in bore 50 by bearing inserts 68 being engageable therewith. The slots 69 are more clearly shown in FIGURES 3 and 4. It is understood that the inserts 68 are composed of any well-known bearing material which allows a sliding of the end guide 66 on the bore 50 for a prolonged period of time while minimizing wear therebetween. Pockets 70 formed in a side wall 72 of the elongated member 67 are adapted to receive bearing inserts 74. Bearing inserts 74 have a flat surface 76 adapted to slidably engage the lateral slot 54 and have an arcuate surface 78 allowing pivotal movement of the insert 74 in the pocket 70. The insert 74 is composed of a bearing material similar to the composition of the inserts 68, but it is understood that the inserts 68 are fixed with respect to the elongated member 67 while the inserts 74 are movable with respect thereto.

Referring to FIGURE 4, the end guide 66 is shown in section so as to clearly set forth its relationship to slot 69 which it is understood is parallel to the axis of the carrier 26 and the boring bar 18 as well as the cooperation with the lateral slot 54 which is offset with respect to the longitudinal axis of the carrier 26 and the boring bar 18. Keeping in mind the relationship of the guide 66 with the slots 54 and 69 and referring to FIGURE 1, it is seen that linear movement of the rod 58 will result in the end guide bearings 68 following the slot 69 while the bearing 74 will move in the offset slot 54. In view of the pivotal mounting of the carrier 26 in which the slot 54 is formed, linear movement of the rod 58 will cause a tilting of the carrier 26 resulting in a cutting bit 80 carried by the boring bar 18 being withdrawn from a bored surface 82. Surface 82 is a surface which is extremely smooth in its completed form and causes the need for a withdrawal of the boring bar without engaging that surface. The rod 58 is moved linearly in any well-known manner, such as by an hydraulic cylinder 84. It is understood, however, that linear movement in the rod 58 can be induced by other means, such as camming devices, air cylinders or the like.

In operation, the configuration of parts shown in FIGURE 1 illustrates the subject invention in a position it would assume after partially completing the boring operation on an aperture 86 to generate the surface 82. The boring machine support 12 is slidably mounted and is adapted to feed the boring bar 18 into the aperture 86. It is understood that the aperture 86 is formed in an object 88 which is fixtured so as to be stationary with respect to the boring machine. In sequence, the boring device 10 is rotated with respect to the boring machine support 12. While rotating the boring machine, support 12 carries the boring bar 18 into the aperture 86 forming therein the surface 82. Power is supplied for rotation of the device 10 and the linear sliding movement of the machine support 12 by the power source 16 in any well-known manner. When the cutting bit 80 has moved either completely through the aperture 86 or to the end of a desired cut, rotation of the bar 18 is stopped and the cylinder 84 is energized driving the rod 58 in the direction of the arrow shown in FIGURE 6 causing the end guide 66 to move in the slot 69 and relative to the lateral slot 54. As the end guide 66 moves in the slot 54, a tilting of the carrier 26 is effected due to the angular disposition of the slot 54 relative to the slot 69 and the longitudinal axis of the body which is relatively fixed and the carrier 26 and boring bar 18 which have a longitudinal axis common to that of the body in FIGURE 1. It is understood that, in FIGURE 6 after being moved, the boring bar 18 and the carrier 26 no longer have a longitudinal axis common to the relatively fixed body 22 and the linearly moving rod 58. As seen in FIGURE 6, with the end guide 66 forced into the slot 54, a camming action takes place between the surface 76 and the insert 74 and the slot 54. It is also seen that spring 62 is further compressed between the retainer 60 and the wall 64. The elastomeric ring 46 is depressed on one side and the bearing surface 36 has moved relative to the inner periphery 40 of the fixed bearing 38 carried by the body 22. This results in the cutting bit 80 being tilted out of engagement with the finished surface 82 and allows the power source to exert a force on support 12 withdrawing the spindle 20 and the boring device 10 carrying the boring bar 18 back through the aperture 86. When the bit 80 and the bar 18 clears the aperture 86, pressure is relieved in the cylinder 84 and the compressed spring 62 draws the rod 58 to the left, as viewed in FIGURE 6. This results in a camming of the bearing insert 74 against the slot 54, thereby repositioning the carrier 26 to the position shown in FIGURE 1. It is understood that in the example shown in the drawings the power source 16 is an hydraulic type which brings about rotation of the spindle 20, the linear movement of the support 12 and the energization of cylinder 84. The type of power and the apparatus needed to bring about the movements described are deemed to be well-known expedients in the art and do not form a portion of the present invention except as to function thereof. The cycling of the various force producing means can be brought about mechanically or electrically and this, too, is regarded as functionally relating to the invention but not a part of the structure thereof.

The utility of the subject invention is enhanced by the bearing surfaces described herein which allow the use of the subject invention in high production machines which are repeatedly cycled when boring a plurality of objects to provide a finished surface 82. In particular, the feature of the rocking inserts 74 allow a firm metal to metal contact between the linearly moving rod 58 and the pivoting carrier 26 during a period of relative movement therebetween. Therefore, the operation of the subject invention is very positive and adapted for high production operations. As previously stated, these high production operations are necessary for economical manufacture of brake master cylinders wherein a piston and seals slide over a surface which should be free from surface defects. It is understood that the operation of the subject invention is not limited to this application but that the example of hydraulic master cylinders is used by way of establishing an operative environment for the present invention.

While the embodiment of the present invention, as herein disclosed, constitutes a preferred form, it is to be understood that other forms might be adopted.

What is claimed is as follows:

1. A boring device for a boring machine having force producing means, said boring device comprising: a body including a circular bearing having an arcuately shaped inner periphery and being carried for rotation by the boring machine and adapted for sliding movement in and out of engagement with an element to be bored, the rotation and sliding movement being in response to forces from the force producing means; said body including elastomeric means positioned adjacent to the arcuately shaped inner periphery to receive a portion of the arcuate shaped portion of said carrier means extending past said arcuately shaped inner periphery during tilting movement of said carrier means.

2. A boring device comprising: a body rotatably mounted on a portion of a boring machine and arranged to be movable linearly on the axis of rotation; carrier means pivotally supported on a portion of said body and arranged to move linearly and rotationally therewith and tiltably with respect thereto; said carrier means having a lateral slot angularly offset with respect to the longitudinal axis of said carriers means and said body; a boring bar carried by said carrier means and including a cutting bit mounted on the periphery thereof, said boring bar extending from said carrier means a distance sufficient to allow the cutting bit to bore a cylindrical shaped aperture creating thereby a smooth surface thereon; and drive means carried in sliding relationship to said slot in said carrier means by said body and being adapted to be driven linearly relative to the longitudinal axis of said body while engaging said angularly offset slot thereby tilting said carrier means on its pivotal mounting resulting in drawing said cutting bit away from the smooth surface, said drive means being a rod adapted to be engaged by a force producing means and being slidably disposed in a wall of said body; a retainer carried by said rod; a spring disposed around said rod between said retainer and said body; and an end guide adapted for being slidably located on a wall of said body and slide portions arranged to engage the lateral slot of said carrier means, said end guide being linearly movable in said body while engaging said lateral slot thereby tilting said carrer means on its pivotal mounting during linear movement.

3. A boring device according to claim 2 wherein the end guide is an elongated member carried on the end of said rod, said elongated member having bearing inserts affixed to edges thereof on surfaces contacting said body, and pockets formed in sides thereof contacting said lateral slot and being adapted to receive bearing inserts movable in said pockets to maintain contact with said lateral slot as said drive means tiltably drives said carrier means into disengaged disposition relative to the finished aperture.

References Cited by the Examiner

UNITED STATES PATENTS

| | | | |
|---|---|---|---|
| 642,138 | 1/1900 | Lee | 77—58.37 |
| 2,295,135 | 9/1942 | Smith | 77—58.31 |
| 3,157,068 | 11/1964 | Rickert | 77—58 |

ANDREW R. JUHASZ, *Primary Examiner.*

G. A. DOST, *Assistant Examiner.*